Nov. 4, 1969  H. STAMPFLI  3,476,353
SERVOVALVE
Filed Jan. 15, 1968
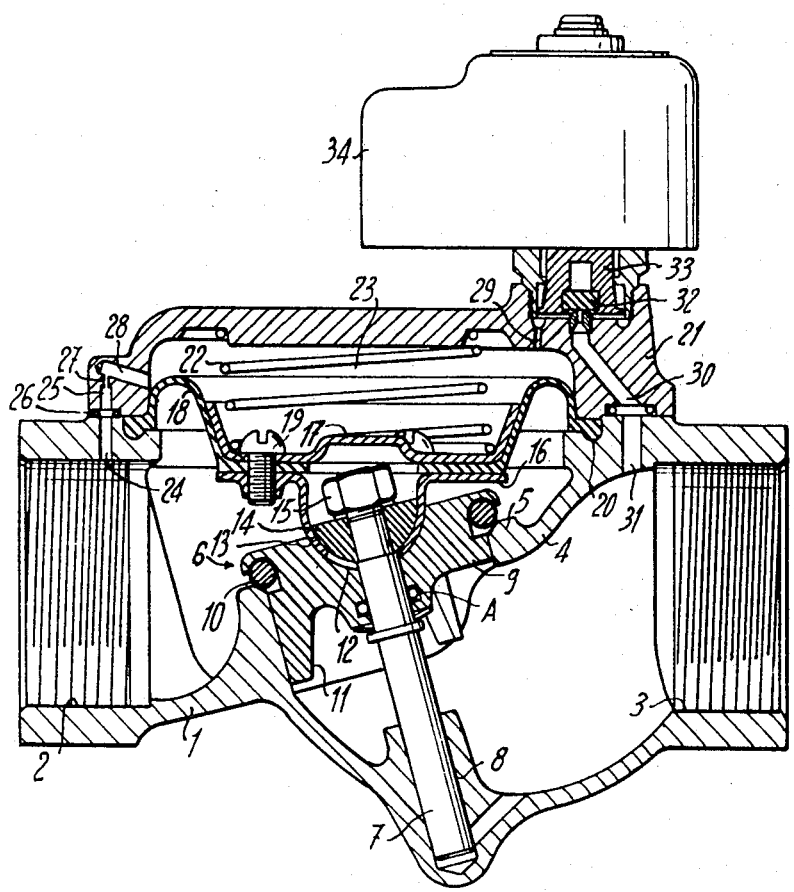
INVENTOR
HARALD STAMPFLI
BY  *Emery L. Groff Jr.*
ATTORNEY

United States Patent Office 3,476,353
Patented Nov. 4, 1969

3,476,353
SERVOVALVE
Harald Stampfli, Petit-Saconnex, Switzerland, assignor to Lucifer S.A., Carouge-Geneva, Switzerland, a company of Switzerland
Filed Jan. 15, 1968, Ser. No. 697,988
Claims priority, application Switzerland, Feb. 1, 1967, 1,573/67
Int. Cl. F16k 31/145, 7/07
U.S. Cl. 251—45                               4 Claims

ABSTRACT OF THE DISCLOSURE

Servovalve with fluid inlet and outlet and a spring-biased movable membrane, subject to fluid pressure on both of its surfaces, connected by a ball-and-socket joint to an obturator which includes the valve poppet. The stem of the obturator extends oblique to the plane of the membrane.

---

The invention relates to servovalves.

In the prior art, servovalves are known which include an obturating means movable for opening and closing at least one fluid passage, and a movable membrane, in the general shape of a body of revolution defining an axis, acted upon by a control fluid. A disadvantage of this type of construction is that servovalves of this kind tend to be rather large and heavy.

The purpose of the invention is a servovalve of the above-described type, which is smaller in size and lighter in weight.

An object of the invention is a servovalve of this type in which the direction along which the obturating means moves is oblique with respect to the axis defined by the membrane.

This object and other objects of the invention will be apparent from the following description of the invention.

The accompanying single figure shows in cross-section one embodiment of the servovalve of the invention.

With reference to the figure of the drawing, the valve has a housing 1 incorporating a thread cylindrical bore 2, in which is threaded a coupling (not shown) for the fluid-supply pipe, and a threaded cylindrical bore 3 for the fluid-outlet pipe. The housing further incorporates, between the two threaded bores 2 and 3, an inclined wall 4 which has a seat 5 that cooperates with an obturator 6 which closes off the communication between the two aforesaid bores.

The obturator comprises a stem 7 which slides in a bore 8 of the housing 1, and carries the valve poppet 9 which is provided with a seal 10. The valve poppet incorporates three fingers 11, of which only two are visible in the figure. These fingers slide up and down the cylindrical wall which forms the extension of the edge of the seat 5. The fingers 11 and the bore 8 serve very satisfactorily to guide the obturator 6 in its movements.

The valve poppet 9 is provided with a hemispherical cavity 12 which, together with a member 13 of corresponding shape, forms a ball-and-socket joint. The two parts of the joint are kept in physical contact by a hemispherical member 14 that is held on the stem 7 by a nut 15. A seal between the valve poppet 9 and the stem 7 is ensured by an O-ring A.

The member 13 incorporates a flat, circular portion 16. Between the portion 16 and a cap 17 is tightly held, by means of screws 19, a flexible membrane 18. The edge of the membrane is held clamped in a circular groove 20 of the housing 1 by a support 21. A helical spring 22, extending between the top and the bottom of the chamber 23 formed by the support 21 and the cap 17, exerts a slight downward force on the membrane.

The chamber 23 is connected to the pressurized control fluid, the flow of which the valve must control. The fluid enters the chamber via the fluid-supply pipe (not shown), an inlet bore 24 in the housing 1, a further bore 25 aligned with the bore 24 and located in the support 21, a bore 27 of reduced cross-section which connects the bore 25 to a final bore 28 that opens into the chamber 23. An O-ring 26 provides a seal between the bores 24 and 25. The fluid contained in the chamber can leave the latter via three bores 29, 30 and 31. The flow of fluid between the bores 29 and 30 is controlled by a sealing member 32 mounted in a magnetic core 33 which is controlled in its movements by an electrically energized coil covered by a hood 34.

When the core 33 is attracted towards the coil, because a current flows through the latter, the core is moved upwards; and the sealing member 32, which is composed of any suitable material, uncovers the bore 30, whereby the chamber 23 is connected to exhaust via the bores 29, 30 and 31, which each have a cross-section far larger than that of bore 27 of reduced cross-section. The lower surface of the membrane 18 is acted upon by the pressure of the fluid entering via bore 2, whereby the pressure forces the membrane upwards against the action of the spring 22, this movement of the membrane causes the obturator 6 to be shifted along the axis of the stem 7, such that the seal 10 is raised off of the seat 5 to provide a path for the fluid from the bore 2 to the bore 3. The axis of the stem 7 is both the axis of the valve poppet 9 and of the obturator 6. It is obvious that the membrane 18 does not move in a direction perpendicular to the principal plane of the cap 17, but instead along the axis of the stem 7. Because of this oblique movement of the membrane, the axis of the spring 22 advantageously extends obliquely between the support 21 and the cap 17, in the chamber 23, as shown in the figure.

To close the valve, the bore 30 is shut off by so shifting the core 33 that the pressure of the fluid acting on the upper and lower surfaces of the membrane gives a zero resultant, whereby the fluid pressure exerted on the valve poppet 9 causes the seal 10 to be reseated on the seat 5, closing the valve.

The novel construction of the invention enables the total height of the valve to be appreciably reduced as compared to known valves, in which the axis of the valve poppet of the obturator is perpendicular to the direction of fluid flow. Moreover, the valve of the invention has less resistance to the fluid flow, because the plane of the seat 5 is inclined and because of the shape of the space defined by the wall 4 and the membrane 18. This annular space has a cross-section that varies from a maximum adjacent the fluid inlet to a minimum remote from the inlet.

In addition, although the seat 5 is inclined with respect to the membrane 18, all of the machinings are circular; and the parts of the valve are concentric and thus can be assembled without particular fitting.

In other embodiments of the invention, the articulation between the membrane 18 and the obturator 6 can be a cardan joint, or an axle perpendicular to the plane defined by the axes of the membrane and the obturator, or a flexible intermediate member. In a more inexpensive embodiment of the invention, a rigid connection can be provided between the obturator and the membrane, the direction of movement of the latter, in this instance, no longer coinciding with its axis of revolution.

I claim:
1. In a servovalve including a housing, obturating means movable for opening and closing at least one fluid passage, movable membrane means in the general shape of a body of revolution and defining an axis, said membrane means acted upon by a control fluid for controlling the movement of the obturating means, the direction along which the obturating means moves being oblique with respect to the axis of the membrane means, the edge of said membrane means fixed to said servovalve housing, means connecting the central part of said membrane means to the obturating means, two planar, spaced bearing surfaces one of which covers the central part of the membrane means, a helical spring in compression and confined between said bearing surfaces, the improvement wherein the axis of said spring is oblique with respect to the two bearing surfaces.

2. In a servovalve including a housing, obturating means movable for opening and closing at least one fluid passage, movable membrane means in the general shape of a body of revolution and defining an axis, said membrane means acted upon by a control fluid for controlling the movement of the obturating means, the direction along which the obturating means moves being oblique with respect to the axis of the membrane means, the edge of said membrane means fixed to said servovalve housing and the central part of said membrane means connected to the obturating means, said obturating means including a poppet valve, a seat cooperating with the poppet valve and a fluid inlet, the improvement comprising a wall inclined with respect to the membrane means and incorporating said seat, said wall defining together with the membrane means an annular space the cross section of which varies from a maximum to a minimum, said space communicating with said fluid inlet where its cross section is at a maximum.

3. In a servovalve including a housing, obturating means movable for opening and closing at least one fluid passage, movable membrane means in the general shape of a body of revolution and defining an axis, said membrane means acted upon by a control fluid for controlling the movement of the obturating means, the direction along which the obturating means moves being oblique with respect to the axis of the membrane means, the edge of said membrane means fixed to said servovalve housing, the improvement comprising a ball and socket joint connecting the central part of said membrane means to the obturating means.

4. In a servovalve including a housing, obturating means movable for opening and closing at least one fluid passage, movable membrane means in the general shape of a body of revolution and defining an axis, said membrane means acted upon by a control fluid for controlling the movement of the obturating means, the direction along which the obturating means moves being oblique with respect to the axis of the membrane means, said obturating means including a poppet valve, a seat cooperating with the poppet valve and a fluid inlet, the improvement comprising a wall inclined with respect to the membrane means and incorporating said seat, said wall defining together with the membrane means an annular space the cross section of which varies from a maximum to a minimum, said space communicating with said fluid inlet where its cross section is at a maximum.

References Cited

UNITED STATES PATENTS

| | | | |
|---|---|---|---|
| 1,505,217 | 8/1924 | Powell | 251—61 X |
| 2,265,586 | 12/1941 | Vernet | 251—61 X |
| 3,379,406 | 4/1968 | Greer | 251—45 |

ARNOLD ROSENTHAL, Primary Examiner

U.S. Cl. X.R.

251—30